United States Patent Office 3,266,236
Patented August 16, 1966

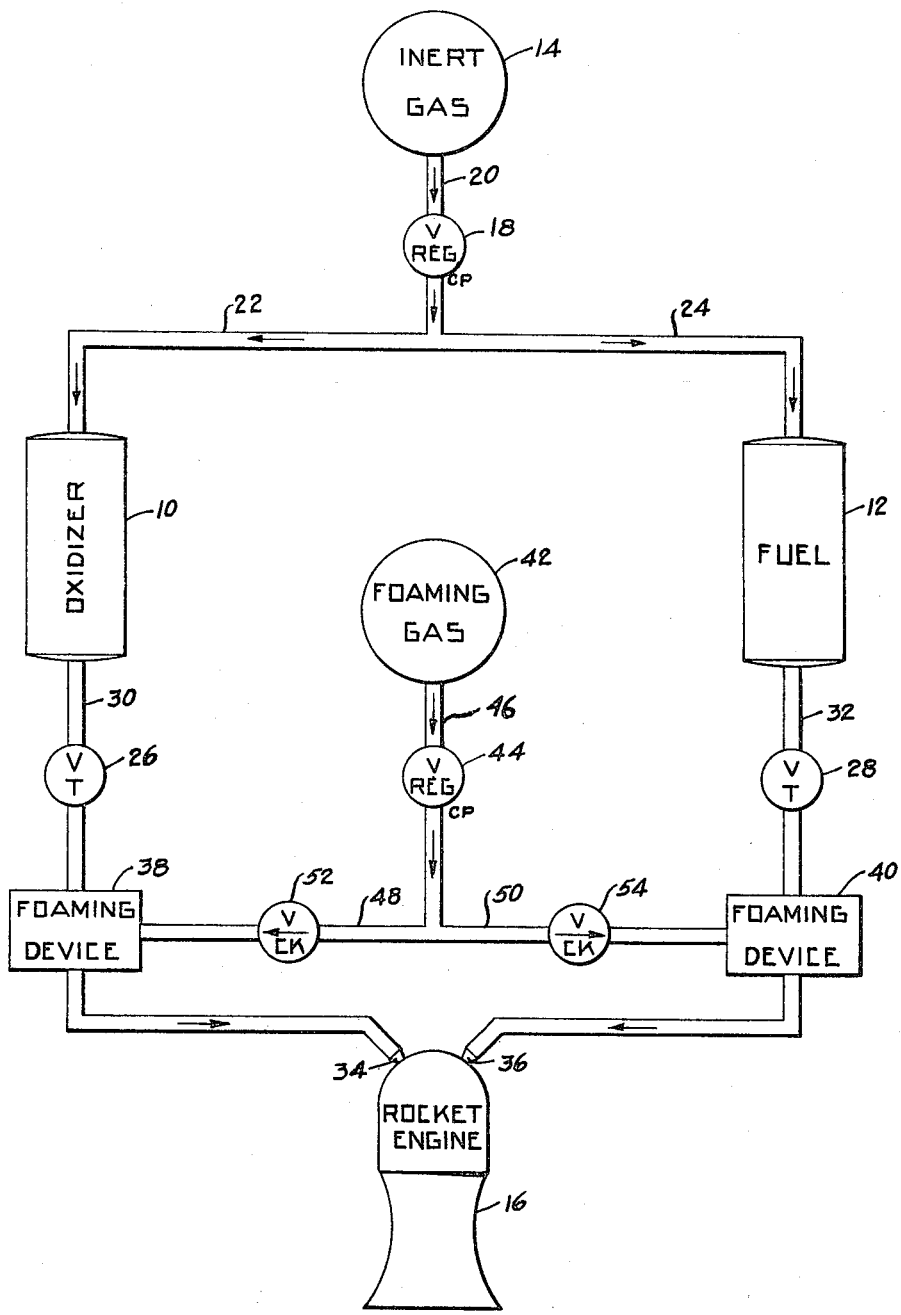

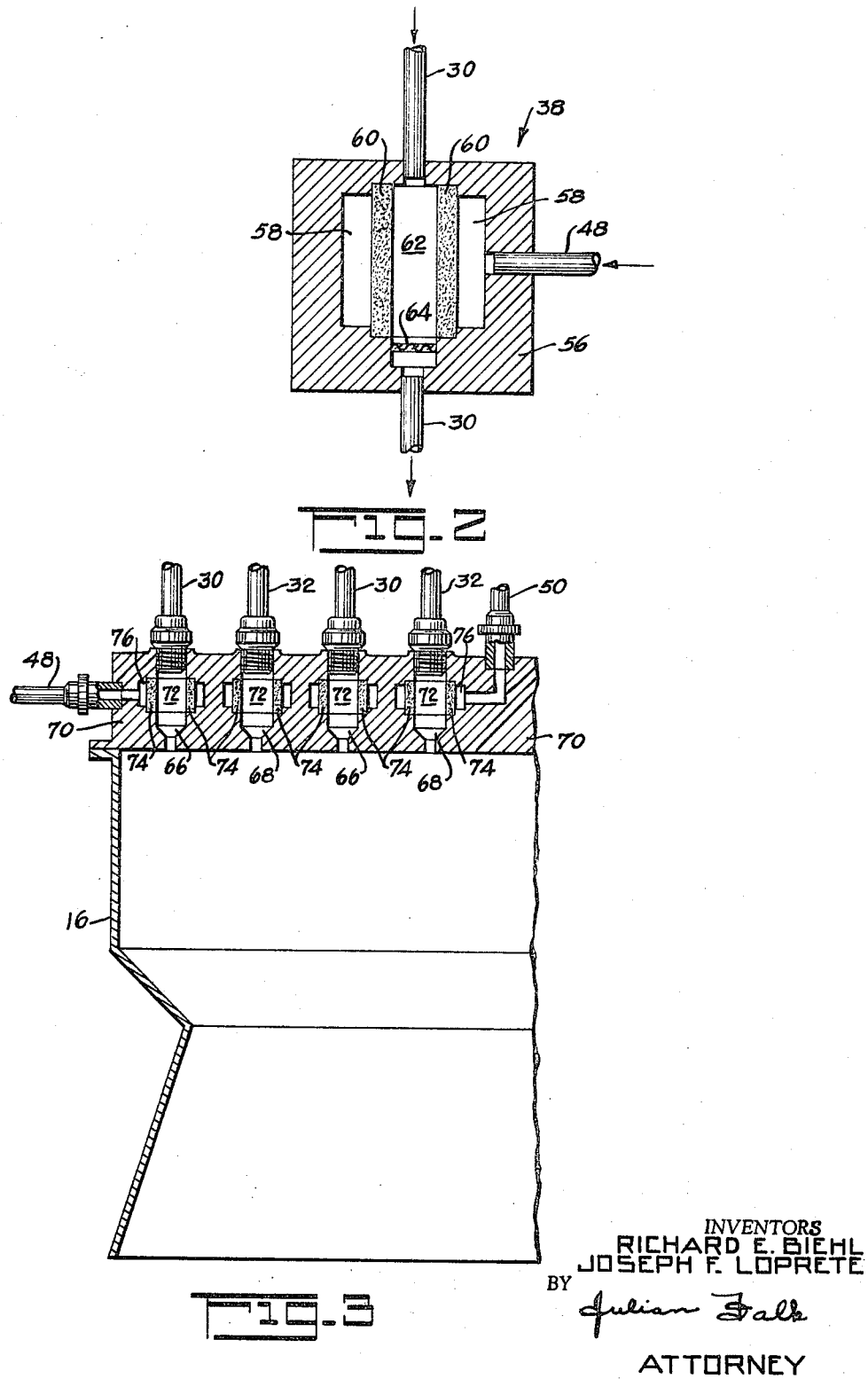

3,266,236
CONTROLLABLE THRUST ROCKET ENGINE
Richard E. Biehl, Pearl River, N.Y., and Joseph F. Loprete, Wayne, N.J., assignors to Curtiss-Wright Corporation, a corporation of Delaware
Filed July 17, 1963, Ser. No. 295,670
11 Claims. (Cl. 60—39.03)

This invention relates to a controllable thrust liquid fuel rocket engine and more particularly to a system and method of controlling thrust by varying the density of the liquid propellant.

Liquid fuel rockets, largely in use today, are of the bi-propellant type wherein a hypergolic fuel-oxidizer system is preferred because then no ignition means is required. In such a system the fuel and oxidizer are stored in separate tanks within the rocket and during engine operation are separately injected into the combustion chamber where upon contact a hypergolic reaction takes place and the fuel and oxidizer are burned to form a large volume of gases which discharge out through the rocket nozzle. Some forms of liquid rockets of the bi-propellant types, however, do make use of ignition means to ignite the propellants and the present invention is applicable to either type.

It has been known that the thrust of a rocket engine may be controlled by varying the propellant weight flow through the injector by varying the pressure upstream of said injector as by a throttle means. Although this system is effective for small flow throttling ranges, such as 3:1, for larger flow throttling ranges the propellant tank pressures and weights are excessive and controlling the rocket thrust by this method becomes impractical, as will be pointed out more clearly hereinafter.

The present invention provides a system and method for controlling the thrust of a liquid fuel rocket engine wherein throttling ranges in excess of 15:1 may be obtained without any substantial increase in propellant tank pressures and weights. The invention generally comprises a system for foaming the propellants prior to injection into the combustion chamber. Foaming in the sense as used in this application may be defined as the homogeneous distribution of a gas within a fluid thereby producing a resultant fluid of desired effective density. The invention is generally carried out by controlling a throttle means for varying the pressure upstream of the propellants upstream of the propellant injectors in proportion to thrust demands. A foaming agent is then fed into the propellants through a fixed orifice adjacent each propellant line and downstream of the throttle means. The foaming agent is introduced under substantially constant pressure and the amount of foaming of the propellants is substantially controlled through the variations in upstream pressures of said propellants. Thus the density of the propellants will be varied by the proportion of foaming agent introduced into the propellants and as a result the thrust produced by the rocket engine will be accordingly varied in proportion to the changes in density of the propellants.

Accordingly, it is one object of the invention to provide a novel and improved means for controlling the thrust produced by a liquid fuel rocket engine.

Another object of the invention is to provide a novel and improved means for varying the density of the propellants injected into a rocket engine combustion chamber for varying the thrust produced by said rocket engine.

A further object of the invention is to provide a novel and improved means for foaming the propellants for a liquid fuel rocket engine whereby the density of the propellants is varied in proportion to the amount of foaming agent introduced into such propellants.

A still further object of the invention is to provide a novel and improved system and method for foaming the propellants for a liquid fuel rocket engine whereby substantially large throttle ranges of thrust may be obtained without significant increases in propellant tank pressures and weights.

An additional object of the invention is to provide a novel and improved foaming and injector arrangement for a liquid fuel rocket engine.

Additional objects and advantages of the invention will be best understood when reading the following detailed description with the accompanying drawings wherein:

FIGURE 1 is a schematic view of a propulsion system for a liquid fuel rocket embodying the invention;

FIGURE 2 is a partial sectional view showing a foaming device used in the arrangement of FIGURE 1; and FIGURE 3 is a partial sectional view of a rocket engine showing an arrangement of foaming devices and injectors which may be incorporated in the invention.

It has been known in the past that the thrust produced by a rocket engine may be controlled by varying the upstream pressure of the propellants before being injected into the combustion chamber. However, for large ranges of thrust control, this system in itself has proved unsatisfactory. As will be pointed out more clearly below, when the range between the minimum and maximum thrust level is increased the propellant tank pressures and weights also proportionately increase so as to become impractical for relatively large variations in thrust control.

It is known that, for a constant specific impulse, the rocket engine thrust is directly proportional to the propellant weight flow. Since thrust is also proportional to the combustion chamber pressure, the area of the nozzle throat and the thrust coefficient, it is evident that in a vacuum, wherein the thrust coefficient is essentially independent of chamber pressure, combustion pressure will vary directly with the propellant weight flow for a constant geometry engine. It is further known that, weight flow is proportional to the square root of the pressure drop across the combustion chamber propellant injector nozzle. Therefore, from the above relationships, it is possible to calculate by known methods the combustion chamber pressures, the pressure drop across the injector, the propellant tank pressures required and the required propellant tank weights for the said tank pressures for any desired thrust level.

Propellant tank pressure is essentially determined by the maximum value of the injector upstream pressure. In order to determine the propellant tank pressure and tankage weight for a propulsion system where thrust is to be controlled by varying injector upstream pressure, the engine design operating conditions at 100% thrust and the desired throttling range must be defined. By way of example, consider the case of a 1500 lb. thrust engine operating at a combustion chamber pressure of 250 p.s.i.a. and system total impulse of one million lb.-seconds. If this was a constant thrust engine, a propellant tank pressure of, for example, approximately 320 p.s.i.a. would be required. Suppose it is desired to operate this engine over a 3:1 range, that is 1500 lbs. to 500 lbs. thrust. The minimum combustion chamber pressure in this case would be approximately 80 p.s.i.a, corresponding to 33% of the maximum propellant weight flow. The pressure drop across the propellant injector nozzle would be for a particular propellant injector nozzle approximately 10 p.s.i.a. Therefore, the pressure drop at 100% thrust would be nine times (three squared) that at the minimum thrust point or 90 p.s.i.a. Adding to this, the 250 p.s.i.a. chamber pressure and the appropriate line drops, the tankage pressure is somewhat higher than 350 p.s.i.a. Therefore, a 3:1 throttling range requires a 50–60 p.s.i. increase in tankage pressure with the attendant weight penalty incurred for said increase in tankage pressure.

Suppose for the same 100% thrust design point a 10:1 throttling range is desired. The minimum combustion chamber pressure will now be approximately 25 p.s.i.a. and the nozzle injector drop now may be approximately 6 p.s.i. Since the desired throttling range is 10:1, the injector pressure drop at 100% thrust must be one hundred times greater (ten squared) or 600 p.s.i. The tank pressure will now be in excess of 850 p.s.i.a. Similar calculations at 15:1 throttling range show that the tank pressure at the 100% thrust point is close to 1400 p.s.i.a., and at 30:1 throttling range, the tank pressure for 100% thrust is over 2100 p.s.i.a. and may be over 3000 p.s.i.a. depending upon the pressure drop at the injector at minimum flow level. When you consider that the tank pressure required for an engine designed to operate at only the 1500 lb. thrust point is 320 p.s.i.a., the weight penalties that attend large throttling ranges, when using injector upstream pressure as the throttling means, are significant. The following table sets forth approximate weight penalty calculations for a 1500 lb. thrust rocket engine for throttling ranges from 1:1 to 15:1. The figures set forth in the following chart are included only for purposes of more clearly understanding the relationship between the tank pressures and weight penalties for an increase in throttling range and do not purport to be inclusive of all factors which may determine the exact values of said figures in a working embodiment:

| Throttle Range | Tank Pressure, p.s.i.a. | Tankage Weight Penalty, lbs. |
|---|---|---|
| 1:1 | 320 | 0 |
| 5:1 | 480 | 90 |
| 10:1 | 850 | 280 |
| 15:1 | 1,400 | 550 |

It can be seen from the above, therefore, that while upstream pressure variations may be practical for small throttling ranges, for throttling ranges beyond 5:1 the weight penalties become excessive so as to make this method of varying the thrust impractical.

It will be apparent from the following description of the present invention that a system and method for controlling the thrust of a liquid fuel rocket over relatively large throttle ranges is provided which uses upstream pressure variation with little, if any, weight penalties. As explained above, the major factor in controlling the thrust of a rocket engine is the control of the weight flow of the propellants through the injector nozzle into the combustion chamber. Basically, the weight flow of a liquid passing through the fixed orifice of an injector nozzle is proportional to the product of the density of the liquid and the pressure drop across the injector nozzle. If the fluid density can be reduced by entraining a gas in the fluid stream ahead of the injector nozzle, the mass flow will be reduced in proportion to the square root of the ratio of density. This characteristic of fluid flow permits a wide range of weight flow rate with little or no change in pressure drop across the orifice. Since a homogeneous disposition of gas within the liquid is desired, the resultant mixture is termed a foam.

A method of foaming propellants for varying the weight flow of said propellants through the injector has been suggested wherein the propellants are fed under substantially constant pressure into a foaming device wherein the propellants are foamed with various amounts of gas. This method requires a variable control for regulating the flow of gas into the propellants. In order to insure a proper mixture of the gas and the liquid for wide ranges of thrust, the pressure of the gas must be correspondingly increased with increases in the throttling range. Since it is well known that high-pressure gas tankage is heavier than liquid tankage on a unit volume basis, this method is also subject to weight penalties as was the case of the prior systems described above. It is apparent that in this gas foaming method the gas pressure must be maintained higher than the propellant pressure in order that the gas can be fed into the liquid propellant. For high throttling ranges, wherein the tank pressures must be increased, the gas tankage pressures and weights must be increased to a point wherein they become excessive. It can be seen therefore, that this method is limited as to the range of throttling that can be employed. A foaming method similar to the type described above is disclosed in United States Patent 3,045,424, issued on July 24, 1962.

The method of the present invention is carried out, with reference to a bipropellant liquid fuel system, by providing liquid propellants (preferably hypergolic) which are separately injected into the combustion chamber of a rocket engine. The flow of the propellant is instituted by providing an inert gas under pressure to force the propellants out of their tanks and into the combustion chamber. Upstream of the propellant injectors, a throttle means is provided for throttling the propellants over the engine thrust range to reduce injector upstream pressure as thrust demand is reduced. Downstream of the throttle means a foaming gas is supplied through a foaming device at constant pressure through a fixed metering system, the weight flow of gas being determined by the ratio of gas delivery pressure to injector upstream pressure. At 100% thrust demand, the pressure of the propellants is substantially higher than the pressure of the foaming gas, which as stated above is kept at a constant pressure. When the thrust demand is reduced, the throttling means is activated for reducing the pressure of the propellants and when said pressure is reduced to a point where it is below the constant pressure of the foaming gas, the gas will begin to flow into the liquid propellant through the foaming device where it will mix with the liquid propellant and reduce its density. If the thrust demand is further reduced, proportionately more gas will flow into the liquid propellant to cause a further decrease in liquid density and thereby change the weight flow of the liquid propellant through the injector nozzle into the combustion chamber which will result in a decrease in thrust output of the rocket engine. This, in effect, reduces the foaming gas requirements in the following manner. For a given weight of gas being introduced into the propellants the volume it displaces is a direct function of the propellant pressure. Therefore, the lower the propellant injection pressure, the less gas by weight is required. Also, the lower the propellant injection pressure, the lower the differential pressure across the injector orifice which, in turn, results in less gas flow for a given thrust level.

Therefore, it can be seen since the foaming gas need not be kept under a substantially high pressure, the resultant gas tank pressure and weight need not be significantly large. In comparing the method of the present invention to a method wherein a constant upstream propellant pressure is used, it has been found that the gas flow rate used in the method of the present invention is reduced by a factor of 100. It has been further found that this system uses significantly less foaming gas than prior systems since the gas is expanded to a lower pressure and thereby occupies a greater volume. As for example, in a 1500 lb. thrust rocket operating at a 15:1 throttling range, the additional weight required for using the present method has been found to be approximately 15 lbs. which is simply the weight of the foaming agent and the tank to hold it, the propellant tank weights being unaffected.

A system for carrying out the present invention is schematically illustrated in FIGURE 1. As shown therein, tanks 10 and 12 are provided for holding an oxidizer and fuel preferably of the hypergolic type. The oxidizer and fuel may be of any suitable type such as, for example, nitrogen tetroxide ($N_2O_4$) and 50% hydrazine and 50% unsymmetrical dimetholhydrazine (UDMH). Connected to each of the tanks 10 and 12 is a tank 14 containing an inert gas, such as helium, etc., which gas is under pressure for forcing the propellants from tanks 10 and 12 in order to supply said propellants to the rocket engine 16. A pressure regulator valve 18 is connected to the line 20 running from the gas tank 14 for maintaining the gas at a substantially constant pressure in lines 22 and 24 feeding the tanks 10 and 12. A variable valve or throttle means 26 and 28 is positioned downstream of tanks 10 and 12 in lines 30 and 32, respectively flowing from said tanks, for varying the pressure of the propellants in response to thrust demands. The variable throttle means 26 and 28 may be suitably controlled by a well known means such as, a computer signal or in a piloted aircraft by a manual means controlled by the pilot. It will be apparent from FIGURE 1 that the throttle means 26 and 28 are positioned upstream of the rocket engine 16 and more particularly upstream of the rocket engine injectors 34 and 36, so that it may be said that the pressure of the propellants is varied upstream from said injectors. Foaming devices 38 and 40 are positioned in lines 30 and 32 downstream of the variable throttle means 26 and 28 and upstream from the injectors 34 and 36. The foaming devices 38 and 40 have for their purpose the introducing of a foaming agent into the liquid propellant for varying the density thereof. The foaming devices 38 and 40 will be more clearly described below. Operatively connected to each foaming device 38 and 40 is a gas tank 42 which contains an inert gas such as helium, nitrogen or hydrogen, under pressure for supplying said foaming agent to a foaming device. A pressure regulator valve 44 is connected into line 46 leading from the tank 42 for maintaining the gas contained in said tank 42 at a substantially constant pressure as it is fed into lines 48 and 50 leading from said line 46. As stated above, the system is so designed so that at 100% thrust level, the pressure of the propellants from tanks 10 and 12 is greater than the pressure of the foaming gas supplied from tank 42. In order to prevent the propellants from flowing into lines 48 and 50 to the gas tank 42 check valves 52 and 54 respectively are provided in lines 48 and 50. It will be understood that the pressure relationship between the propellants and the foaming gas will vary according to the maximum thrust level design of the particular rocket engine. As the variable throttle means 26 and 28 are adjusted for a reduction in thrust demand the pressure of the propellants from tanks 10 and 12 will be reduced upstream of the foaming devices 38 and 40. When said pressure is reduced to a point where it is below the pressure of the foaming gas, said gas will flow into the foaming device and be dispersed into the liquid propellants. It will be seen therefore, that the amount of foaming of the liquid propellants is controlled primarily by the differential in pressure between said propellants and the pressure of the foaming gas and that no special means for varying the gas pressure is required. As explained above, the density of the propellants leaving the foaming device and being injected into the combustion chamber of the rocket engine 16 will be proportional to the amount of gas introduced into said liquid propellants and therefore the weight flow of liquid propellant will be reduced with a resultant reduction in rocket thrust.

In FIGURE 2 there is shown a sectional view of the foaming device 38 schematically illustrated in FIGURE 1, which foaming device is substantially identical to the foaming device 40 and therefore only one is shown in FIGURE 2. As shown in said figure, the foaming device 38 comprises an outer body 56 having a cavity 58 therein. Positioned within the cavity 58 and suitably supported in the outer body 56 is an annular member 60 being in the shape of a hollow cylinder which member 60 is composed of a porous ceramic material, as illustrated, but may be also formed from other porous materials as, for example, a micro-mesh screen, or a metal with extremely small holes spaced over the surface of said member. The hollow center portion of the annular member 60 defines an enlarged passageway 62 which communicates at each end thereof with the propellant line 30 for passing a liquid propellant in one end of the foaming device 38 and out the other end. The line 48 for supplying gas to the foaming device 38 communicates with the cavity 58 at substantially right angles to the liquid propellant line 30. It will be apparent therefore, that when the pressure of the gas is higher than the pressure of the liquid propellant flowing through the foaming device, the gas will flow into the cavity 58 and through the porous member 60 where it will be dispersed into the liquid propellant to foam the same. Thus, under these conditions, the density of the liquid propellant leaving the foaming device through line 30 as indicated by the arrow in FIGURE 2, will be substantially less than the density of the liquid propellant entering the foaming device at the other side through a line 30. It will further be obvious that when the pressure of the liquid propellant entering the foaming device 38 becomes greater than the pressures of the gas entering said foaming device 38, no gas will flow through the porous member 60 into the liquid propellant due to the differential in pressure which is essentially the case at full thrust conditions. Conversely, as the pressure of the gas exceeds the pressure of the liquid propellant the proportional amount of liquid propellant leaving the foaming device will become less as said gas pressure increases in proportion to the liquid propellant pressure. As stated above, this variation in density of the liquid propellants results in a variation of thrust produced by the rocket engine since the weight flow of propellant into the combustion chamber of said rocket engine will be varied as the density of said propellants is varied. A screen 64 or other similar device may be positioned downstream of the porous member 60 for additional turbulence to the foamed propellant in order to insure that the gas will be homogeneously distributed through said liquid propellants.

In FIGURE 3 there is shown a sectional view of a portion of a rocket thrust chamber and nozzle and particularly shows another arrangement of foaming devices and injectors. As illustrated therein a plurality of injectors is provided for injecting the fuel and oxidizer into the combustion chamber of the rocket engine, there being one set of injectors for the oxidizer and one set of injectors for the fuel, said oxidizer injector nozzles being designated at 66 and said fuel injector nozzles being designated at 68. Of course, it should be understood that the invention is not limited to the number and type of injector as illustrated in FIGURE 3, and any suitable number and type may be provided. The respective lines 30 and 32 going from the oxidizer and fuel tanks to the injectors are illustrated in FIGURE 3 as being connected to their respective injector nozzles 66 and 68 and also shown operatively connected to the injector nozzles are the respective lines 48 and 50 flowing from the tank 42 containing the foaming agent for foaming the respective oxidizer and fuel propellants. Each of the injectors 66 and 68 is positioned within a wall 70 of the rocket engine and a hollow passageway 72 is provided between each of said injectors and their respective supply line 30 or 32. Surrounding at least a portion of each of the passageways 72 is an annular porous member 74 which is substantially identical to the porous member illustrated in FIGURE 2. Each porous member 74 is surrounded by an annulus 76 to which is connected either the gas foaming line 48 or 50, as illustrated. Although the gas lines 48 and 50 for the foaming agent are only illustrated as connected to two of the injectors in FIGURE 3, it should be understood that said gas lines are suitably connected around the engine to each of the injectors 66 and 68. As in the case of the embodiment of the foaming device described in relation to FIGURE 2, when a differential in pressure is present so that the liquid entering the passageways 72 is at a lower pressure than the gas in lines 48 or 50, the gas will be dispersed through the porous member 74 into said passageway 72 for foaming the liquid propellants before they are injected through the injector nozzles 66 and 68 into the combustion chamber of the rocket engine 16. The embodiment of FIGURE 3 has the advantage that the liquid propellants are foamed substantially immediately before they are injected into the combustion chamber thereby preventing any chance from the gas settling out of the liquid propellants or from forming pockets within said propellants. In this way, a near perfect homogeneous mixture of the gas and liquid is brought about whose density is dependent upon the amount of gas mixed with the liquid propellant.

From the above description it can be seen that applicant has provided a system and method for varying the thrust of a rocket over a relatively wide thrust range with little added weight to the system. The system utilizes the principle of throttling by upstream pressure variation while eliminating the enormous tank weight penalties associated with previous method when large throttle ranges are required. By using the upstream pressure variation in conjunction with foaming of the liquid propellants, throttle ranges of 30:1 or greater, can be obtained with a minimum weight penalty.

While the invention has been described in detail in its preferred embodiment, it will be understood that the invention is not intended to be limited by said details and that changes and modifications may be made by those skilled in the art without departing from the spirit and scope of the invention. For example, the invention is not intended to be limited to the type of liquid propellants disclosed herein or the gases suggested for pressurizing said propellants and for foaming the same. Further, the pressures required for operation of the invention will depend upon the size and thrust limits of the rocket and may be accordingly varied without departing from the scope of said invention. We intend to cover all such modified forms in the appended claims.

We claim:
1. In a propulsion system comprising:
  (a) a rocket motor having a combustion chamber and an exhaust nozzle;
  (b) passage means including nozzle means at its downstream end for supplying a liquid propellant under pressure to said combustion chamber;
  (c) means for injecting said liquid propellant into said combustion chamber for ignition therein, said rocket motor producing a thrust which increases with increases in weight flow of said propellant injected into said combustion chamber;
  (d) means adjustable for regulating the pressure of said liquid propellant upstream of said injector nozzle means; and
  (dd) means for supplying a gas foaming agent including means for maintaining said supply of gas foaming agent under constant pressure which constant pressure is substantially less than the storage pressure of said liquid propellant;
  (e) means for mixing a gas foaming agent with said liquid propellant in said passage means at a point where said liquid propellant pressure varies in response to adjustment by said regulating means when said liquid propellant pressure at said point is reduced below the pressure of said gas foaming agent whereby said liquid propellant is foamed by said foaming agent for reducing the weight flow of said liquid propellant into said combustion chamber to reduce the rocket thrust output.

2. In a propulsion system as recited in claim 1 wherein said means adjustable for regulating the pressure of said liquid propellant comprises:
  (a) adjustable valve means disposed in said passage means for said liquid propellant for varying the pressure of said liquid propellant between said valve means and injector means.

3. In a propulsion system as recited in claim 1 wherein said means for mixing a gas foaming agent with said liquid propellant includes:
  (a) a foaming device operatively connected between said means adjustable for regulating the pressure of said liquid propellant and said injector means;
  (b) said foaming device including means therein disposed between the flow of liquid propellant and said gas foaming agent for dispersing said foaming agent within said liquid propellant when the pressure of said gas foaming agent exceeds the pressure of said liquid propellant within said foaming device.

4. In a propulsion system as recited in claim 1 wherein said means for injecting said liquid propellant into said combustion chamber comprises:
  (a) a plurality of injectors supported in said rocket motor adjacent said combustion chamber; and
  (b) a foaming device for each of said injectors positioned adjacent thereto in said rocket motor for dispersing said gas foaming agent into said liquid propellant substantially immediately before injection of said liquid propellant into said combustion chamber.

5. In a propulsion system as recited in claim 1 wherein:
  (a) means are provided for separately injecting each of two liquid propellants into said combustion chamber; and
  (b) each of said liquid propellants having separate storage means for storing said propellants under pressure, separate adjustable means for regulating the pressure of said liquid propellants upstream of said injector nozzle means and separate means for mixing each of said liquid propellants with said gas foaming agent.

6. In a propulsion system as recited in claim 5 wherein said means for separately injecting said propellants into said combustion chamber includes:
  (a) a plurality of injectors supported in said rocket motor adjacent said combustion chamber for injecting said propellants therein, there being at least one injector for each of said propellants;
  (b) said separate means for mixing each of said propellants with said gas foaming agent including a foaming device for each injector positioned adjacent its associated injector in said rocket motor; and
  (c) means for supplying said gas foaming agent to each of said foaming devices for separately foaming each of said liquid propellants substantially immediately before injection into said combustion chamber and including means for dispersing said gas foaming agent into each of said propellants for homogeneously mixing said gas foaming agent with said liquid propellants.

7. In a propulsion system comprising:
  (a) a rocket motor having a combustion chamber and an exhaust nozzle;
  (b) means for storing a liquid propellant under pressure;
  (c) passage means including nozzle means at its downstream end for supplying said liquid propellant under pressure to said combustion chamber;
  (d) means for injecting said liquid propellant into said combustion chamber for ignition therein such that said rocket motor produces thrust which increases with increases in weight flow of said liquid propellant into said combustion chamber;
  (e) foaming means operatively connected between said propellant storing means and said nozzle means;
  (f) means for supplying a gas foaming agent to said foaming means including means for maintaining said supply of gas foaming agent under constant pressure which constant pressure is substantially less than the liquid propellant storage pressure; and (g) adjustable valve means operatively connected between said propellant storing means and said foaming means for regulating the pressure of said liquid propellant in response to variations in thrust demand such that the pressure of said liquid propellant may be reduced below the pressure of said foaming agent whereby said foaming agent will flow into said foaming means for mixing with said liquid propellant therein and thereby reduce the weight flow of said liquid propellant into said combustion chamber.

8. A method for controlling thrust output in a propulsion system having a rocket motor and means for injecting a propellant under pressure into said rocket motor, said method comprising:
  (a) regulating the pressure of said propellant upstream of said injector means in response to variations in thrust demand so that the pressure of said propellant is regulated in accordance with increases and decreases in thrust demand;
  (b) supplying a foaming agent under constant pressure which constant pressure is less than the pressure of said propellant at least during maximum thrust demand and greater than the pressure of said propellant at reduced levels of thrust demand;
  (c) dispersing said foaming agent into said propellant when the pressure of said propellant is reduced below the constant pressure of said foaming agent for foaming said propellant such that the density of said propellant is decreased with increases in the amount of foaming agent dispersed therein; and
  (d) injecting said foamed propellant into the combustion chamber of said rocket motor whereby the weight flow of said propellant is reduced for reducing the thrust output of said rocket motor in accordance with a reduction in thrust demand.

9. A method of controlling thrust output in a propulsion system having a rocket motor and means for injecting a propellant under pressure into the combustion chamber of said rocket motor, said method comprising:
  (a) throttling the pressure of said propellant upstream of said injector means in response to reductions in thrust demand;
  (b) supplying a foaming agent under a constant pressure which pressure is less than the unthrottled pressure of said propellant and greater than at least some throttled pressures of said propellant;
  (c) dispersing said foaming agent into said propellant when the pressure of said propellant is throttled below the constant pressure of said foaming agent for foaming said propellant such that as the pressure of said propellant is reduced in response to decreasing thrust demand, the proportion of foaming agent dispersed into said propellant is increased; and
  (d) injecting said foamed propellant into the combustion chamber of said rocket motor whereby the weight flow of said propellant injected into said combustion chamber is governed by the amount of foaming agent dispersed into said propellant for controlling the thrust output of said rocket motor.

10. A method of controlling thrust output in a propulsion system having a rocket motor and means for injecting two propellants under pressure into the combustion chamber of said rocket motor for combustion therein, said method comprising:
  (a) throttling the pressure of each of said propellants upstream of said injector means in response to reduction in thrust demand;
  (b) supplying a foaming agent under a constant pressure which pressure is less than the unthrottled pressure of each of said propellants and greater than at least some throttled pressure of each of said propellants;
  (c) mixing said foaming agent separately with each of said propellants when the pressure of said propellants is less than the constant pressure of said foaming agent for forming foamed mixtures of lesser density than each of said separate propellants, the density of said mixtures becoming less as the amount of foaming agent mixed therewith increases; and
  (d) injecting each of said foamed mixtures separately into the combustion chamber of said rocket motor whereby the thrust output of said rocket motor decreases with decreases in the density of said mixtures.

11. A method of controlling thrust output in a propulsion system having a rocket motor and means for injecting at least one propellant under pressure into the combustion chamber of said rocket motor, said method comprising:
  (a) storing said propellant under pressure;
  (b) storing a foaming agent under pressure;
  (c) regulating the flow of said foaming agent for a constant pressure;
  (d) controlling the pressure of said propellant upstream of said injector means in response to variations in thrust demand such that for maximum thrust demands the pressure of said propellant exceeds the constant pressure of said foaming agent and as the thrust demand is reduced, the pressure of said propellant is correspondingly reduced below the constant pressure of said foaming agent;
  (e) feeding said foaming agent under constant pressure to said propellant such that as the pressure of said propellant is reduced below the constant pressure of said foaming agent, said foaming agent will flow into said propellant and mix therewith in accordance with the differential in pressure between said propellant and said foaming agent, to form a foamed mixture of lesser density than said propellants; and
  (f) injecting said foamed mixture into the combustion chamber of said rocket motor whereby the thrust output of said rocket motor will be reduced as the density of said foamed mixture is reduced.

References Cited by the Examiner
UNITED STATES PATENTS
3,045,424    7/1962    Morrell    60—35.6 X
3,166,900    1/1965    Stegen    60—39.03 X MARK NEWMAN, *Primary Examiner.*

SAMUEL LEVINE, *Examiner.*

D. HART, *Assistant Examiner.*